US008813069B2

(12) United States Patent
Schneider

(10) Patent No.: US 8,813,069 B2
(45) Date of Patent: Aug. 19, 2014

(54) MIGRATION OF FUNCTIONALITIES ACROSS SYSTEMS

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 394 days.

(21) Appl. No.: 12/475,321

(22) Filed: May 29, 2009

(65) Prior Publication Data

US 2010/0306769 A1 Dec. 2, 2010

(51) Int. Cl.
G06F 9/455 (2006.01)
(52) U.S. Cl.
CPC ........ G06F 9/45533 (2013.01); G06F 9/45537 (2013.01); G06F 9/45558 (2013.01)
USPC .......................................................... 718/1
(58) Field of Classification Search
CPC ............ G06F 9/45533; G06F 9/45558; G06F 9/45537; G06F 11/203; G06F 2009/45591
USPC .............................................. 718/1; 709/213
See application file for complete search history.

(56) References Cited

U.S. PATENT DOCUMENTS

| 6,397,242 | B1 | 5/2002 | Devine et al. |
| 6,658,571 | B1 | 12/2003 | O'Brien et al. |
| 6,785,886 | B1 | 8/2004 | Lim et al. |
| 7,219,354 | B1 | 5/2007 | Huang et al. |
| 7,539,987 | B1 * | 5/2009 | Dey et al. ........................... 718/1 |
| 7,971,255 | B1 | 6/2011 | Kc et al. |
| 8,429,648 | B2 | 4/2013 | Schneider |
| 8,561,090 | B2 | 10/2013 | Schneider |
| 2004/0064813 | A1 | 4/2004 | Neiger et al. |
| 2005/0076324 | A1 | 4/2005 | Lowell et al. |
| 2005/0257243 | A1 | 11/2005 | Baker |
| 2006/0075464 | A1 | 4/2006 | Golan et al. |
| 2007/0006228 | A1 | 1/2007 | Grobman et al. |
| 2007/0199045 | A1 | 8/2007 | Kime et al. |
| 2007/0300219 | A1 | 12/2007 | Devaux |
| 2008/0163211 | A1 * | 7/2008 | Mizuno ............................. 718/1 |
| 2008/0244096 | A1 * | 10/2008 | Springfield et al. .............. 710/5 |
| 2008/0313730 | A1 | 12/2008 | Iftimie et al. |
| 2009/0037911 | A1 * | 2/2009 | Ahuja et al. ................... 718/100 |
| 2009/0125902 | A1 * | 5/2009 | Ghosh et al. ...................... 718/1 |
| 2009/0125974 | A1 * | 5/2009 | Zhang et al. ...................... 726/1 |
| 2009/0150510 | A1 * | 6/2009 | Kovacs et al. ................. 709/213 |
| 2009/0259798 | A1 * | 10/2009 | Wang et al. .................... 711/103 |
| 2010/0161978 | A1 * | 6/2010 | Bacher ......................... 713/166 |
| 2010/0218201 | A1 | 8/2010 | Schneider |
| 2010/0306766 | A1 | 12/2010 | Schneider |

OTHER PUBLICATIONS

Watson, Robert N.M., "Exploiting Concurrency Vulnerabilities in System Call Wrappers", WOOT '07 First USENIX Workshop on Offensive Technologies, Aug. 6-10, 2007, Boston, 8 pages.

(Continued)

Primary Examiner — Thomas Lee
Assistant Examiner — Xuxing Chen
(74) Attorney, Agent, or Firm — Lowenstein Sandler LLP

(57) ABSTRACT

Some embodiments of a method and an apparatus to migrate functionalities across systems have been presented. In one embodiment, a system call from an application running on a first system is detected. The first system has a first version of an operating system, but the system call requires a functionality that is not available in the first version of the operating system. The functionality is available in a second version of the operating system running on a second system. Therefore, the system call is reflected from the first system to the second system.

19 Claims, 6 Drawing Sheets

(56) References Cited

OTHER PUBLICATIONS

Wikipedia, "System Call", last modified: Jan. 19, 2009, accessed at: http://en.wikipedia.org/wiki/System_call, accessed on: Jan. 28, 2009, 4 pages.
Wikipedia, "Kernel (computing)", last modified: Jan. 26, 2009, accessed at: http://en.wikipedia.org/wiki/Kernel_(computer_science), accessed on: Jan. 28, 2009, 22 pages.
Terrence Mitchem, Raymond Lu, Richard O'Brien; Using kernel hypervisors to secure applications; Computer Security Applications Conference, 1997. Proceedings., 13th Annual; Aug. 12, 1997; pp. 175-181.
Timothy Fraser, Lee Badger, Mark Feldman; Hardening COTS software with generic software wrappers; Security and Privacy, 1999. Proceedings of the 1999 IEEE Symposium; Issue date 1999; pp. 2-16.
Office Action for U.S. Appl. No. 12/393,997, mailed Nov. 18, 2011.
Office Action for U.S. Appl. No. 12/474,214, mailed Nov. 9, 2011.
Office Action for U.S. Appl. No. 12/474,214, mailed May 18, 2012.
Notice of Alowance for U.S. Appl. No. 12/393,997, mailed Apr. 25, 2012.
Office Action for U.S. Appl. No. 12/393,997, mailed Apr. 25, 2012.
Notice of Allowance for U.S. Appl. No. 12/474,214, mailed Dec. 20, 2012.

* cited by examiner

MIGRATION OF FUNCTIONALITIES ACROSS SYSTEMS

TECHNICAL FIELD

Embodiments of the present invention relate to computing environment, and more specifically to migrating functionalities across computing systems.

BACKGROUND

Conventionally, a computing system (e.g., a server, a desktop computer, etc.) has an operating system installed therein. Some examples of an operating system include Windows Vista®, Linux, etc. The operating system acts as an interface between hardware and user applications by coordinating the use of hardware resources between user applications. The operating system provides various functionalities, which are accessible by the user applications using system calls. A system call as used herein broadly refers to a request from a user application to the operating system for performing a specific task.

As computing technologies are developed, more and more functionalities are supported in newer versions of operating systems. However, older versions of the operating systems do not support these additional functionalities. As a result, in order to run applications that require these new functionalities on a computing device, a copy of a newer version of a particular operating system has to be installed on the computing device. For entities having a large number of computing devices, the licensing fee required to upgrade all computing devices to a newer version of the operating system is very costly. Therefore, these entities may opt for upgrading the operating systems on only a limited number of computing devices, leaving the rest of the computing devices unable to run the applications that require the upgraded operating system.

BRIEF DESCRIPTION OF THE DRAWINGS

The present invention is illustrated by way of example, and not by way of limitation, in the figures of the accompanying drawings and in which.

DETAILED DESCRIPTION

Figure 1:
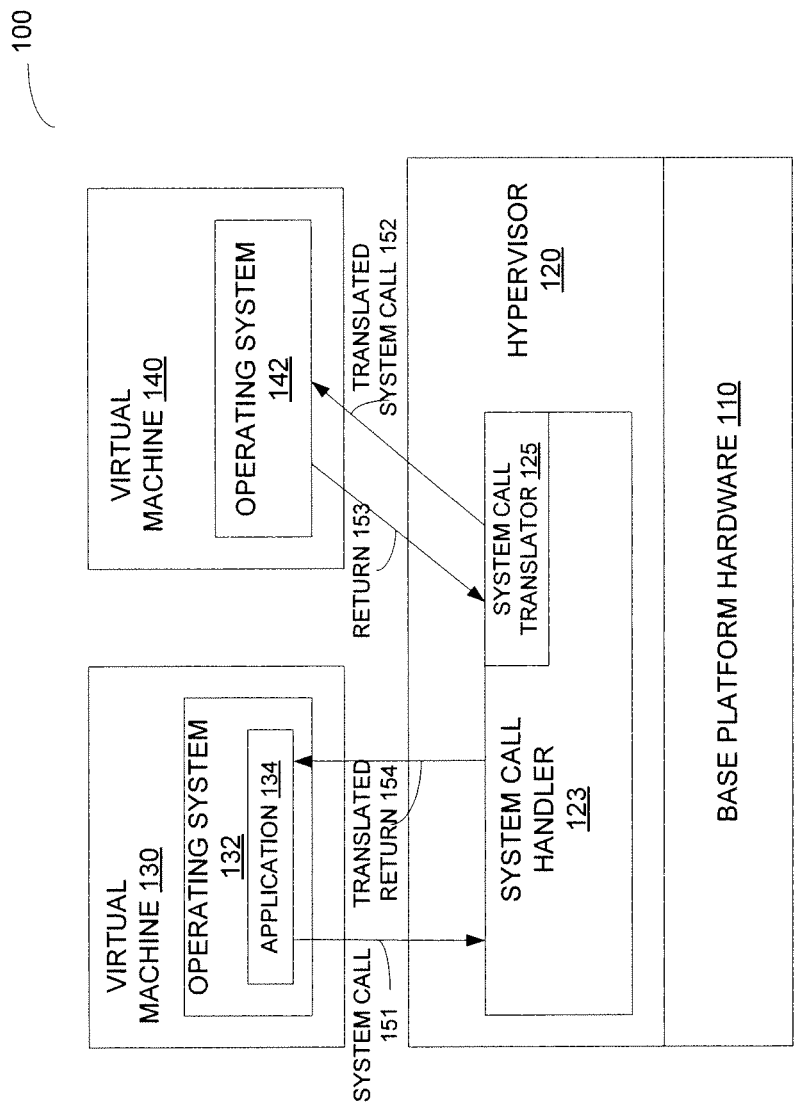
FIG. 1 illustrates one embodiment of a computing system.

Described herein are some embodiments of a method and an apparatus to migrate functionalities across systems. In one embodiment, a system call from an application running on a first system is detected. The first system has a first version of an operating system, but the system call requires a functionality that is not available in the first version of the operating system. However, the functionality is available in a second version of the operating system running on a second system. Therefore, the system call is reflected from the first system to the second system. The first and the second systems may be real physical computing systems (e.g., personal computers and/or servers coupled to each other via a network), or virtual machines running on a single physical computer. More details of some embodiments of the method and apparatus to migrate functionalities across systems are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates one embodiment of a computing system. The system 100 includes base platform hardware 110, a hypervisor 120, and virtual machines 130 and 140. The base platform hardware 110 includes physical hardware components in the system 100, such as processing devices (e.g., central processing unit, multi-core processors, graphics processor, etc.), memory controller, memory devices, etc. The hypervisor 120, also known as the virtual machine monitor (VMM), is a module running on the base platform hardware 110 to virtualize the hardware 110 and software such that multiple operating systems can simultaneously run on the hardware 110. The hypervisor 120 can provision and start virtual machines, such as virtual machines 130 and 140, to run on the base platform hardware 110. A virtual machine broadly refers to a software implementation of a machine that executes programming instructions to perform operations and tasks as if executed by a physical machine, such as a personal computer. One or more virtual machines may run on a hypervisor on a single physical machine. A virtual machine may be a virtual host or a virtual guest. However, the virtual machines 130 and 140 may have different operating systems and different tools installed on them. Note that there may be additional virtual machines in the system 100 in different embodiments.

In some embodiments, an operating system 132 and another operating system 142 are installed in the virtual machines 130 and 140, respectively. The operating system 142 supports one or more functions not provided by the operating system 132. For instance, the operating system 142 may be an upgraded version of the operating system 132. In order to migrate the one or more functions supported by only the operating system 142 to the virtual machine 130, the hypervisor 120 may process system calls from applications running on the operating system 132 as follows.

In some embodiments, an application 134 running on the operating system 132 sends a system call 151 to the hypervisor 120. The hypervisor 120 includes a system call handler 123 to process the system call 151. The system call handler 123 may first determine if the system call 151 requires any functionality not supported by the operating system 132, but supported by the operating system 142. If so, then the system call handler 123 may further process the system call 151 using a system call translator 125. In some embodiments, the system call translator 125 is implemented as a module within the system call handler 123. Alternatively, the system call translator 125 may be implemented as a module separate from the system call handler 123.

The system call translator 125 can translate the system call 151 into a form appropriate for the operating system 142. In some embodiments, the system call translator 125 may replace parameters of the system call 151 with parameters that would be recognized by the operating system 142. For instance, the system call translator 125 can replace the addresses of pointers, process or thread identification, filenames, strings, device or file handles, etc., in the system call 151. After translating the system call 151, the system call translator 125 forwards the translated system call 152 to the operating system 142 on the virtual machine 140. Because the operating system 142 supports the required functionality of the system call 152, the operating system 142 can process the translated system call 152 and send a return 153 in response to the translated system call 152 to the hypervisor 120.

In some embodiments, the hypervisor 120 determines that the return 153 is in response to the system call 152 originally made from the application 134 running on the operating system 132. Therefore, the hypervisor 120 uses the system call translator 125 to translate the return 153. In some embodiments, the system call translator replaces parameters in the return 153 with parameters that would be recognized by the operating system 132. For instance, the system call translator 125 can replace the addresses of pointers, process or thread identification, filenames, strings, device or file handles, etc., in the return 153. Then the system call handler 123 sends the translated return 154 to the application 134 running on the operating system 132.

Figure 2:
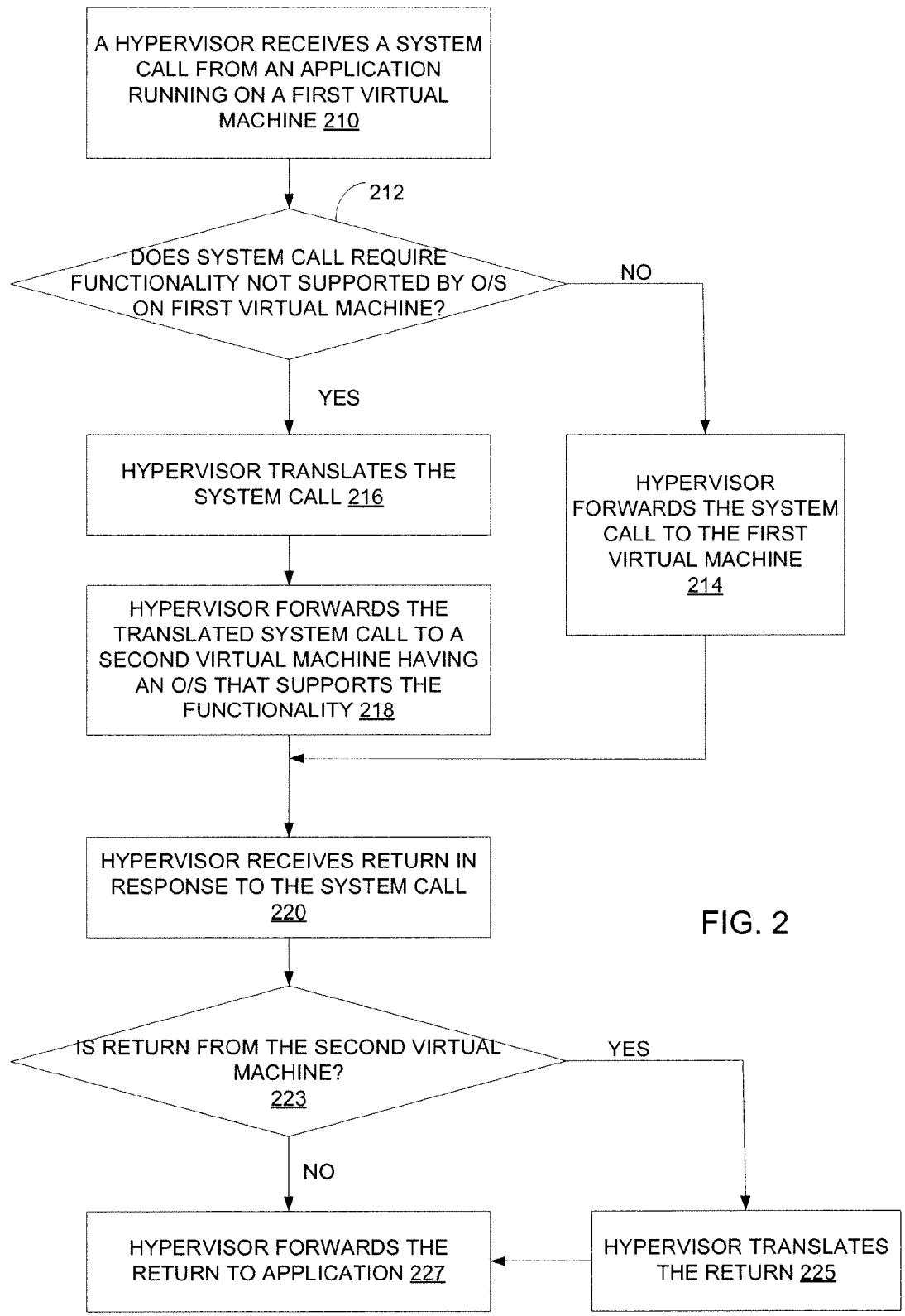
FIG. 2 illustrates a flow diagram of one embodiment of a method to migrate functionalities between virtual machines.

FIG. 2 illustrates a flow diagram of one embodiment of a method to migrate functionalities between virtual machines. The method may be performed by processing logic that may comprise hardware (e.g., circuitry, dedicated logic, programmable logic, microcode, etc.), software (such as instructions run on a processing device), firmware, or a combination thereof. For instance, at least part of the method may be performed by the hypervisor 120 running on base platform hardware 110 as shown in FIG. 1 in some embodiments.

Initially, a hypervisor receives a system call from an application running on a first virtual machine (processing block 210). In some embodiments, the system call includes one or more parameters supplied by an application. For instance, the application may attempt to open a document, and the system call includes a file name of the document. Other examples of the parameters include memory address locations, device identifiers, network addresses, shared memory structures, mutual exclusion structures, processes, threads, etc.

In some embodiments, processing logic determines if the system call requires functionality not supported by the operating system installed on the first virtual machine (processing block 212). If the functionality is supported, then the hypervisor forwards the system call to the first virtual machine (processing block 214). Otherwise, the hypervisor translates the system call (processing block 216). For instance, the hypervisor may translate the system call by replacing the pointer addresses in the system call with addresses appropriate for a second virtual machine, which has an upgraded version of the operating system to support the functionality required. Then the hypervisor forwards the translated system call to the second virtual machine (processing block 218).

In some embodiments, the hypervisor receives a return in response to the system call forwarded to either the first or the second virtual machine (processing block 220). Then processing logic transitions to processing block 223 to determine if the return is from the second virtual machine. If the return is not from the second virtual machine, then the return is from the first virtual machine, and thus, the hypervisor may forward the return to the application that made the system call (processing block 227). Otherwise, if the return is from the second virtual machine, then the hypervisor translates the return (processing block 225). Again, the hypervisor may translate the return by modifying parameters in the return, such as the addresses of pointers, process or thread identification, filenames, strings, device or file handles, etc. Then processing logic forwards the return to the application that made the system call (processing block 227).

Figure 3:
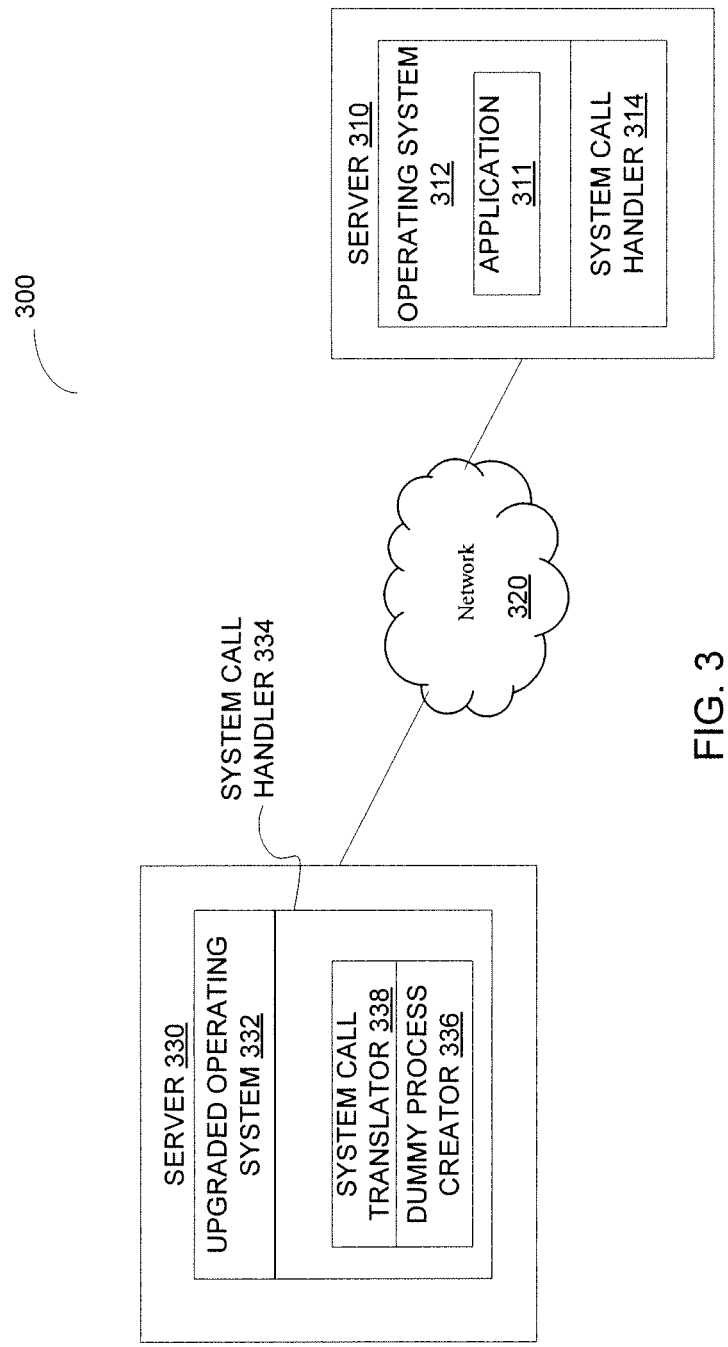
FIG. 3 illustrates one embodiment of a computing system.

FIG. 3 illustrates one embodiment of a computing system. The computing system 300 includes two servers 310 and 330, coupled to each other via a network 320. The network 320 may include various networks, such as a local area network (LAN), Ethernet, wide area network (WAN), Internet, etc. Note that there may be more devices coupled to the network 320 in different embodiments, such as additional servers, client machines, etc. Furthermore, although the following discussion uses servers as an example, one should appreciate that the technique disclosed is also applicable to other computing devices, such as personal computers, laptop computers, personal digital assistants, etc. In some embodiments, the server 330 has more processing power than the server 310. For instance, the server 330 may have one or more processing devices that run at a higher speed, upgraded software tools, etc. In particular, the server 330 has an upgraded operating system 332 installed, which provides additional functionalities not supported by the operating system 312 on the server 310.

In some embodiments, the server 330 further includes a system call handler 334 coupled to the upgraded operating system 332. The system call handler 334 has a system call translator 338 and a dummy process creator 336. The server 310 also has a system call handler 314 coupled to its operating system 312. There may be one or more applications running on the operating system 312, such as application 311. As mentioned above, the upgraded operating system 332 on the server 330 has functionalities not supported by the operating system 312. In order to allow applications that utilize such functionalities to run on the server 310 as well, these functionalities may be migrated to the server 310. One example of functionality migration is discussed in details below to illustrate the concept.

In some embodiments, the application 311 sends a system call to the system call handler 314. The system call handler 314 checks the system call and determines that the system call requires a functionality not supported by the operating system 312, but supported by the operating system 332. Thus, the system call handler 314 forwards the system call to the server 330 via the network 320. Note that for system calls that do not require functionalities not supported by the operating system 312, the system call handler 314 may simply forward these system calls to the operating system 312. When the server 330 receives the system call, the system call handler 334 of the server 330 first processes the system call as follows.

In some embodiments, the system call handler 334 on the server 330 uses the dummy process creator 336 to create a dummy process. Then the system call handler 334 handles the system call received from the server 310 as if it is a system call from the dummy process. The system call translator 338 may translate the system call into a form that would be recognized by the operating system 332. For example, the system call translator 338 may replace the parameters in the system call (e.g., pointer addresses) with another set of parameters that would make sense to the operating system 332. Then the system call handler 334 forwards the translated system call to the operating system 332.

In response to the translated system call, the operating system 332 sends a return to the system call handler 334. The system call handler 334 may determine that the return is for the system call from the dummy process, and thus, has to be translated and then forwarded onto a remote server. The system call translator 338 may translate the return, such as by replacing pointer addresses with other addresses that would make sense to the operating system 312 on the server 310. Then the system call handler 334 forwards the translated return to the server 310. The system call handler 314 on server 310 receives the translated return and forwards it to the application 311.

Using the above approach, the application 311 can still run on the server 310 even though the server 310 does not have a copy of the upgraded operating system 332 installed. Thus, a company may save licensing fee by avoiding upgrading the operating system on all of its servers. Moreover, some of the servers may be limited in hardware capability such that installation of the upgraded operating system on these servers is not feasible. By migrating the functionalities of the upgraded operating system using the above approach, these servers may still remain useful without installing the upgraded operating system.

Figure 4:
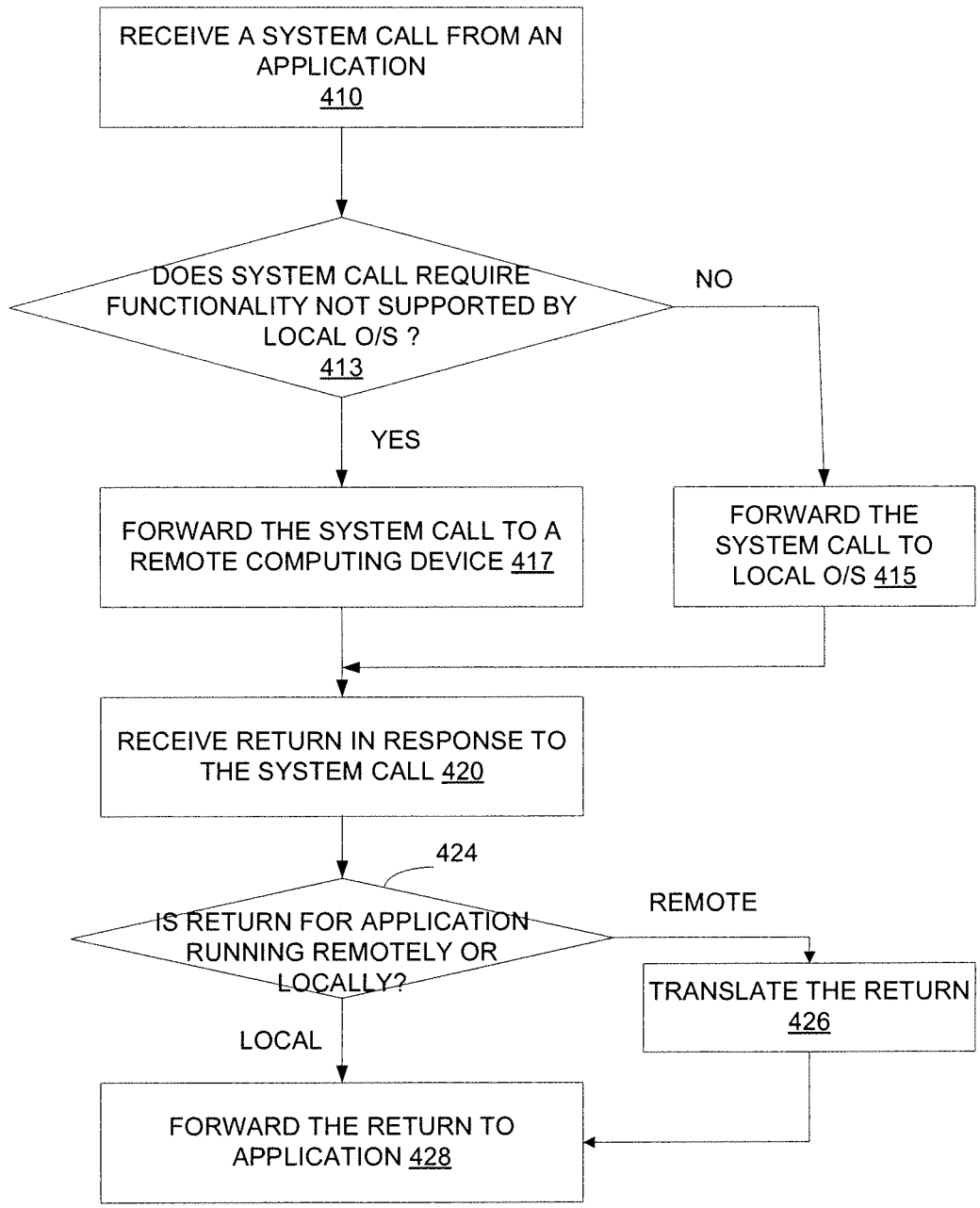
FIG. 4 illustrates a flow diagram of one embodiment of a method to leverage functionalities available remotely.

FIG. 4 illustrates a flow diagram of one embodiment of a method to leverage functionalities available remotely. The method may be performed by processing logic that may comprise hardware (e.g., circuitry, dedicated logic, programmable logic, microcode, etc.), software (such as instructions run on a processing device), firmware, or a combination thereof. For instance, at least part of the method may be performed by the server 310 illustrated in FIG. 3.

Initially, processing logic receives a system call from an application (processing block 410). Then processing logic determines if the system call requires a functionality not supported by a local operating system (processing block 413). If the system requires a functionality not supported by a local operating system, then processing logic forwards the system call to a remote computing device having an upgraded version of the operating system that supports the functionality (processing block 417). Processing logic may forward the system call over a network, such as network 340 in FIG. 3. Otherwise, processing logic forwards the system call to the local operating system (processing block 415).

In some embodiments, processing logic receives a return in response to the system call (processing block 420). Then processing logic checks if the return is for an application running locally or remotely (processing block 424). If it is for an application running remotely, then processing logic translates the return (processing block 426) and then forwards the return to the application running remotely (processing block 428). Otherwise, processing logic directly transitions into processing block 428 to forward the return to the application.

Figure 5:
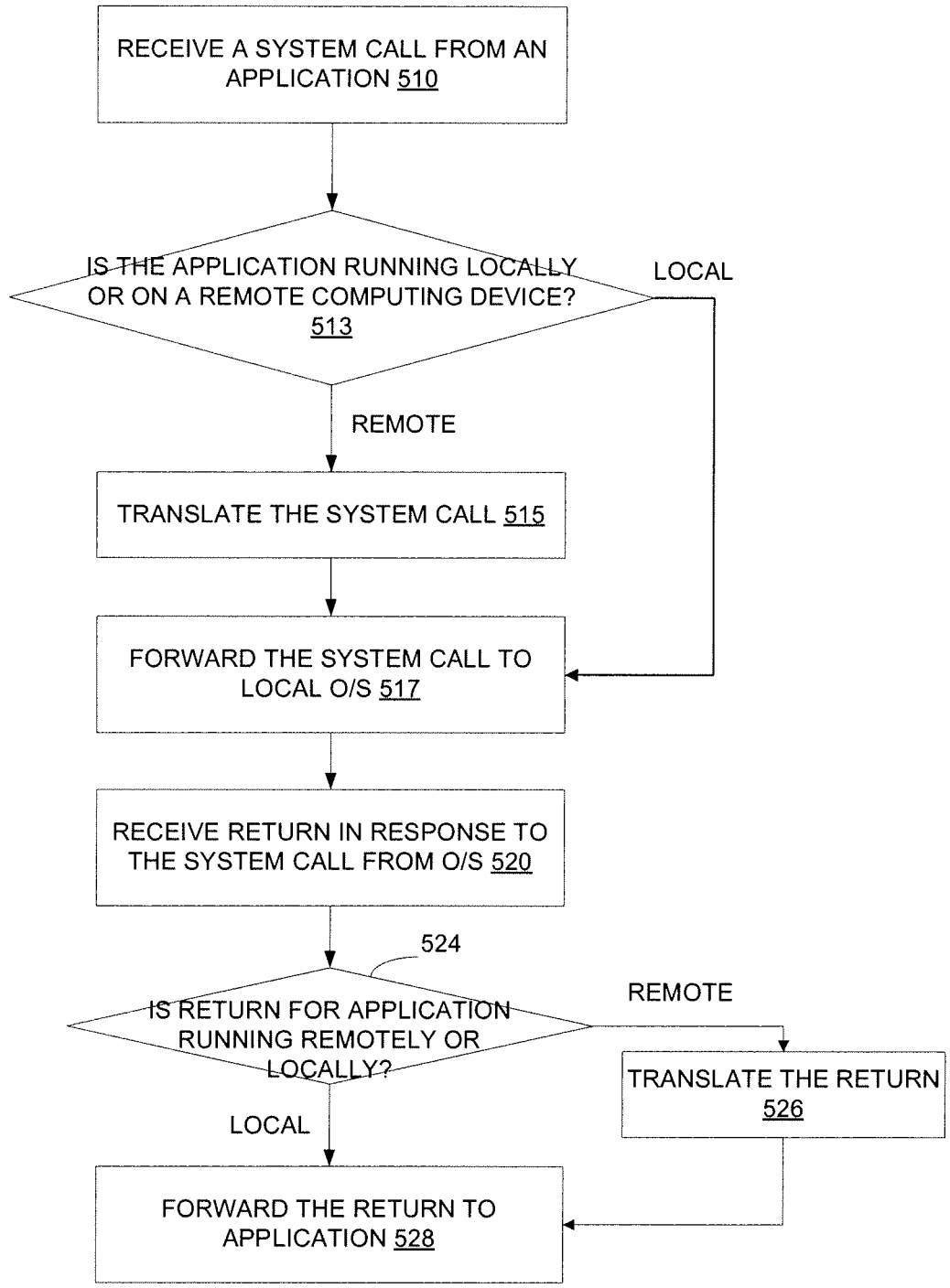
FIG. 5 illustrates a flow diagram of one embodiment of a method to process a system call from a remote computing device.

FIG. 5 illustrates a flow diagram of one embodiment of a method to process a system call from a remote computing device. The method may be performed by processing logic that may comprise hardware (e.g., circuitry, dedicated logic, programmable logic, microcode, etc.), software (such as instructions run on a processing device), firmware, or a combination thereof. For instance, at least part of the method may be performed by the server 330 illustrated in FIG. 3.

Initially, processing logic receives a system call from an application (processing block 510). Then processing logic determines if the application is running locally or on a remote computing device (processing block 513). If the application is running locally, processing logic forwards the system call to a local operating system (processing block 517). Otherwise, processing logic may translate the system call because the parameters of the system call from the remote computing device may not be appropriate for the local operating system (processing block 515). For instance, processing logic may translate the system call by replacing the pointer addresses in the system call with addresses appropriate for the local operating system. Then processing logic forwards the system call to a local operating system (processing block 517).

In some embodiments, processing logic receives a return from the operating system in response to the system call (processing block 520). Then processing logic determines if the return is for an application running remotely or locally (processing block 524). If the return is for an application running locally, then processing logic forwards the return to the application (processing block 528). Otherwise, if the return is for an application running remotely, then processing logic translates the return (processing block 526) and then forwards the translated return to the application (processing block 528). Again, processing logic may translate the return by modifying parameters in the return, such as the addresses of pointers, process or thread identification, filenames, strings, device or file handles, etc.

Figure 6:
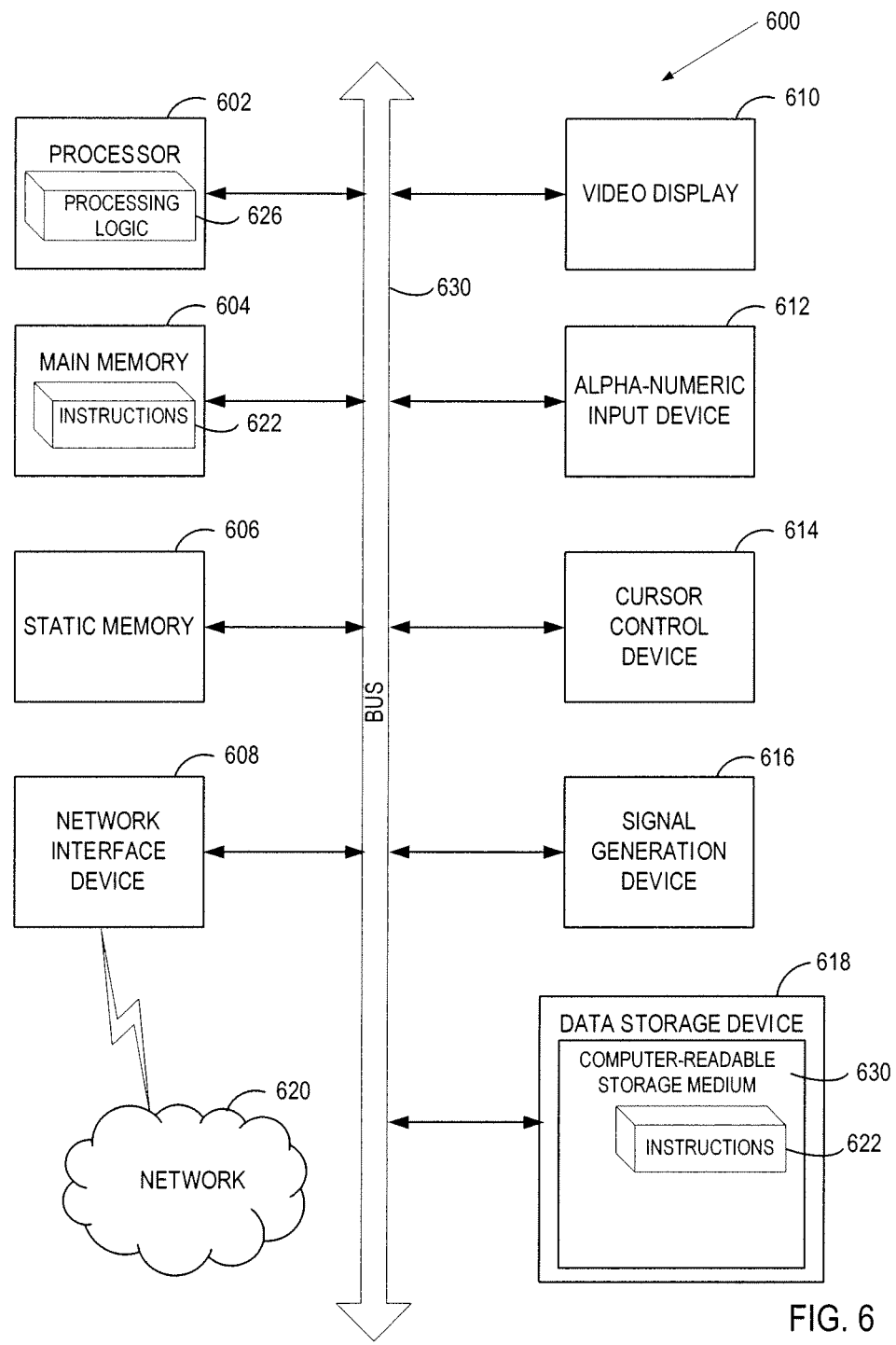
FIG. 6 illustrates a block diagram of an exemplary computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 418, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-accessible storage medium 630 (also known as a computer-readable storage medium) on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting computer-accessible storage media. The software 622 may further be transmitted or received over a network 620 via the network interface device 608.

While the computer-readable storage medium 630 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

Thus, some embodiments of a method and an apparatus to migrate functionalities across systems have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   detecting, by a processor executing a hypervisor, a system call from an application running on a first virtual machine comprising a first operating system that does not support functionality required by the system call, wherein the first operating system lacks support for the functionality without any commands disabling the functionality;
   identifying a second virtual machine comprising a second operating system that supports the functionality required by the system call;
   translating the system call by modifying one or more parameters in the system call;
   re-directing, by the processor executing the hypervisor, the system call from the first virtual machine to the second virtual machine;
   receiving a return in response to the system call from the second virtual machine; and
   translating the return.

2. The method of claim 1, wherein the first operating system is a first version of a particular operating system and the second operating system is a second version of the particular operating system.

3. The method of claim 2, wherein the second version of the particular operating system is an upgraded version of the particular operating system.

4. The method of claim 1, further comprising:
   recognizing the system call's requirement for the functionality.

5. The method of claim 1, further comprising:
   sending the translated return from the hypervisor to the first virtual machine.

6. The method of claim 1, further comprising:
   executing, by the processor, a kernel module to recognize the system call's requirement for the functionality and to re-direct the system call to the second virtual machine, wherein the second virtual machine runs on a remote computing device, and wherein a second processor of the remote computing device is to create a dummy process associated with the system call.

7. The method of claim 6, wherein the system call and the return are translated in view of the dummy process.

8. An apparatus comprising:
   a processor to:

receive a system call created by an application running on a remote computing device, the remote computing device comprising a first operating system that does not support functionality required by the system call, wherein the first operating system lacks support for the functionality without any commands disabling the functionality;

create a dummy process, wherein the system call is to be processed as though it was generated by the dummy process;

translate parameters in the system call received from the remote computing device for a second operating system running on the processor, wherein the functionality is available in the second operating system; and translate a response to the system call; and a network interface, coupled to the processor, to couple to the remote computing device via a network.

9. The apparatus of claim 8, wherein the network interface forwards the translated return to the remote computing device.

10. An apparatus comprising:

a memory to store instructions for a hypervisor; and a processor, coupled to the memory, to execute:

a first virtual machine comprising a first operating system that does not support functionality required by a system call, wherein the first operating system lacks support for the functionality without any commands disabling the functionality;

a second virtual machine comprising a second operating system that supports the functionality required by the system call; and the hypervisor, to manage the first and the second virtual machines, the hypervisor comprising a system call handler to determine requirements of the system call and to re-direct the system call to the second virtual machine if the system call requires the functionality not supported by the first operating system, the hypervisor further comprising a call translator to translate one or more parameters of the system call and to translate a response to the system call from the second virtual machine.

11. The apparatus of claim 10, wherein the one or more parameters of the system call are translated before the system call is redirected to the second virtual machine.

12. The apparatus of claim 10, wherein the response to the system call is translated before the return is forwarded to the first virtual machine.

13. A non-transitory tangible computer-readable storage medium embodying instructions that, when executed by a processor, will cause the processor to perform operations comprising:

detecting, by the processor that executes a hypervisor, a system call from an application running on a first virtual machine comprising a first operating system that does not support functionality required by the system call, wherein the first operating system lacks support for the functionality without any commands disabling the functionality;

translating the system call by modifying one or more parameters in the system call;

re-directing, by the processor executing the hypervisor, the system call from the first virtual machine to the second virtual machine;

receiving a return in response to the system call from the second virtual machine; and translating the return.

14. The non-transitory tangible computer-readable storage medium of claim 13, wherein the first operating system comprises a first version of a particular operating system and the second operating system comprises a second version of the particular operating system.

15. The non-transitory tangible computer-readable storage medium of claim 14, wherein the second version of the particular operating system is an upgraded version of the particular operating system.

16. The non-transitory tangible computer-readable storage medium of claim 13, wherein the operations further comprise:

recognizing the system call's requirement for the functionality.

17. The non-transitory tangible computer-readable storage medium of claim 13, wherein the operations further comprise:

sending the translated return from the hypervisor to the first virtual machine.

18. The non-transitory tangible computer-readable storage medium of claim 13, wherein the operations further comprise:

executing, by the processor, a kernel module to recognize the system call's requirement for the functionality and to re-direct the system call to the second virtual machine, wherein the second virtual machine runs on a remote computing device, and wherein a second processor of the remote computing device is to create a dummy process associated with the system call.

19. The non-transitory tangible computer-readable storage medium of claim 18, wherein the system call and the return are translated in view of the-dummy process.

* * * * *